Aug. 13, 1929.   C. A. LAEMMEL   1,724,717
METHOD OF FORMING CUTTER PLATES
Filed Jan. 21, 1929
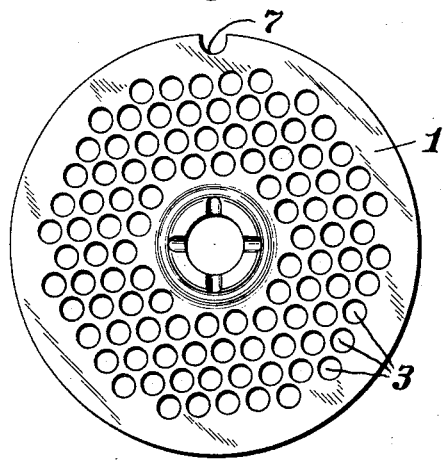
Fig.1.
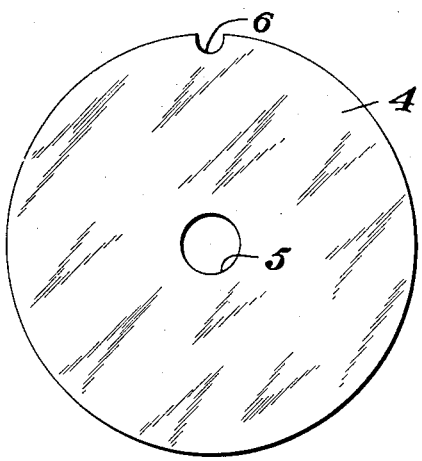
Fig.2.
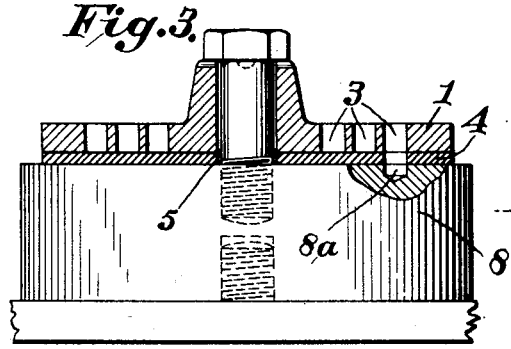
Fig.3.
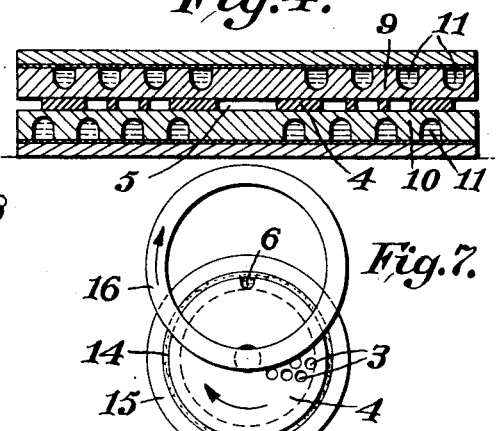
Fig.4.
Fig.7.
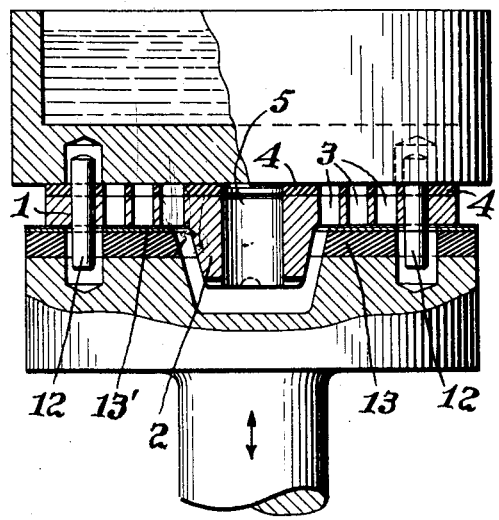
Fig.5.
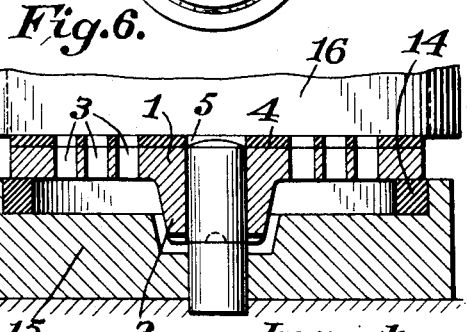
Fig.6.
Inventor:
Charles A. Laemmel,
by Parker Cooke
Atty.

Patented Aug. 13, 1929.

1,724,717

UNITED STATES PATENT OFFICE.

CHARLES A. LAEMMEL, OF BROOKLYN, NEW YORK, ASSIGNOR TO ATLANTIC SERVICE COMPANY, INC., OF BROOKLYN, NEW YORK, A CORPORATION OF NEW YORK.

METHOD OF FORMING CUTTER PLATES.

Application filed January 21, 1929. Serial No. 333,817.

My invention relates to new and useful improvements in the method of forming cutter plates for meat grinding machines and has for an object to provide a method whereby a backing plate of relatively cheap metal has rigidly secured thereto a thin perforated metal disc formed of high speed tool steel, so as to present sharp cutting edges to the meat in the grinder.

The disc and backing plate are very similar to the disc and plate shown in my Patent No. 1,695,898, and the present invention contemplates a method of forming this cutter plate, fastening the disc to the backing plate and drilling the disc so that the two plates will be correctly and perfectly held with respect to each other; it not being necessary to provide any up-standing peripherial edge for holding the metal disc to the backing plate.

Still another object of the invention is to provide a method wherein the parts may be drilled without bending or forming any rough edges about the perforations of the thin metal disc and wherein the two plates will always be properly aligned and wherein the parts cannot be separated except by a factory operation.

Still another object of the invention is to hold the disc and backing plate under pressure when the parts are being sweated together and to so grind the outer surface or cutting face of the disc that the said face will be as flat as it is possible to make it.

Still another object of the invention is to so form the cutting disc and to so hold the same to the backing plate that it may be used for a considerable length of time before heating the parts to separate them.

With these and other objects in view, the invention consists in certain new and novel arrangements and combination of parts, as hereinafter more fully described and pointed out in the claims.

In the drawing showing the preferred method,

Fig. 1 is a plan view of the predrilled backing plate,

Fig. 2 is a plan view of a high speed tool disc just after the same has been blanked out, Fig. 3 is a section of the backing plate, the disc temporarily attached by an adhesive and clamped on a drilling block of the press table ready for drilling.

Fig. 4 is a sectional view showing a hardening of the disc between two cooling blocks by water circulation in the blocks, Fig. 5 is a sectional view which shows the manner of sweating together the backing plate and the disc, allowing the disc and the backing plate to cool under pressure.

Fig. 6 is a sectional view showing the cutter plate supported on a rubber pad so that the disc may be finally ground.

Fig. 7 is a plan view of Fig. 6.

Referring now more particularly to the drawings, showing the assembled cutter plate made up of the backing plate and disc, and also showing partly diagrammatically the method carried out in forming the cutter plate, there is shown in Fig. 1 what I term a backing plate 1 with the center hub 2, on the back face of this plate, there also being shown a series of holes or perforations 3 through which the ground products pass.

This backing plate is generally procured in the open market and per se, forms no part of the present invention.

There may also be seen in Fig. 2, the cutting disc 4, which is properly formed of high speed tool steel, these are blanked out in a die (not shown), so that there will be the center hole 5 and the peripherial notch 6, which when the parts are aligned will register with the notch 7 in the backing plate 1. Of course the hole 5 will register with the opening of the hub 2, so that the shaft of the meat grinder, (not shown) will pass through both parts when the backing plate and disc are in their final arrangement.

After blanking out the high speed disc 4 of the same diameter as the backing plate 1, the said disc is temporarily fastened to the backing plate by any form of desirable adhesive and the backing plate and disc are then clamped to a cast iron block 8 and drilled.

After the two parts are clamped, the disc is drilled, the backing plate 1 acting as a drilling jig, which prevents drill breakage, burrs on the high speed disc and prevents distortion of the high speed disc while drilling.

After the disc is thus drilled, the plate is then separated from the cast iron block 8 and the thin disc is then hardened and preliminarily ground.

It will be noticed that the drill cuts slightly into the cast-iron block. This is necessary in order to insure a full size hole through the disc. This cast iron block is then resurfaced, removing all of the cavities made by the drill, and is again smoothed and straightened for the next plate to be drilled on it. Of course the cast-iron block keeps getting thinner with each resurfacing and when too thin to properly reinforce the thin disc in drilling, it is discarded.

In hardening the thin disc, it has been found necessary to cool the disc between cold steel blocks under great pressure, which is accomplished by providing the blocks 9 and 10 with spiral cavities 11, so that water may circulate through the spiral cavities and assure a perfectly even cooling of the thin disc and the blocks, being under great pressure prevents a distortion of the disc.

After the high speed disc is hardened, it is sweated to the backing plate but before sweating, the same is to be tinned.

It is necessary that the tin be kept from the front or cutting edge and I accomplish this by holding the disc 4 in a special holder and apply it under pressure to a heated copper block, the surface of which is tinned.

This copper block is not shown in the drawings, but its function will be perfectly understood.

By using this copper block, a thin film of tin is left only on the surface which is to be joined or seated to the front surface of the backing plate. In the same manner the backing plate surface is tinned and while the backing plate is still hot, it is put on a heated steel block (not shown) which maintains the proper temperature. The thin high speed disc which has its proper side already tinned, is placed upon the backing plate with suitable flux interposed.

Of course it is highly important that the holes in the plate and the holes in the disc be in perfect alignment and positively held until they become sweated together substantially as one solid piece.

This alignment is accomplished by inserting two taper pins 12 through two of the holes of the backing plate 1 and the disc 4, which will readily hold the parts in their proper alignment.

In cooling, in order to insure uniform pressure between the two pieces, a rubber pad 13 is placed between the lower part of the press, (see Fig. 5), and the back part of the plate 1. This pad is protected from the heat of the hot plate by an asbestos and aluminum shield 13' and thus the pressure is evenly distributed over the entire surface of the two pieces and all surplus tin is forced out, forming a perfect joint.

This will be readily understood, as rubber is known to flow rather than compress, thus allowing the even pressure to be applied as above mentioned. Any surplus tin adhering to the sweated plate is removed by grinding the periphery and the little notch 6 and any tin may be removed from the holes by redrilling.

It is then necessary to grind the plate to insure a perfectly flat surface and as the surface of the hub plate is not accurately machined, I have found that it is again necessary to place the plate, hub downward, on a rubber ring 14 mounted in a block 15, and pass a ring wheel 16 in a path crossing the center of the disc and revolve the disc at the same time and in that manner produce a perfectly flat surface on the disc.

After the cutter plate is thus formed, that is, a backing plate of soft metal and a cutting disc of high speed tool steel and the parts hardened, ground and sweated and finally ground, the cutter will give long and continuous service. After the edges about the perforations become dull, the cutter plate may be returned to the factory and again placed on a rubber pad and revolved, while the ring wheel passes there-over and again regrinds the cutter and quickly sharpens the same.

From the foregoing, it will be seen that I have produced a new and efficient method for forming cutter plates or meat choppers that are relatively cheap and at the same time highly efficient in action and made and held together without any extraneous means and formed with the same great care as other high grade tools.

Having thus described my invention, what I claim as new and desire to secure by Letters Patent is:—

1. The method of forming cutter plates for grinding machines which consist in employing a back of relatively soft metal, temporarily sticking a disc of tool steel thereto, drilling the thin disc with a series of holes, separating the parts and hardening the drilled disc, tinning the disc and the surface of said backing plate, sweating the parts together, cooling the said disc with the two parts under pressure and grinding the outer face of said disc.

2. The method of forming cutter plates for grinding machines consisting of employing a soft metal backing plate and a hard metal disc, temporarily fastening the parts together and drilling the disc, tinning the said parts and sweating them together under pressure and finally grinding the surface of said cutter disc.

3. The method of forming cutter plates for grinding machines consisting of employing a pre-drilled backing plate, temporarily securing a disc of hard steel to the face of said backing plate, drilling the cutter disc, the backing plate acting as a jig, separating the parts and hardening and grinding said disc, tinning the said parts and sweating the parts together, cooling said parts with the disc and plate under pressure and finally regrinding the surface plate of said disc.

4. The method of forming a cutter plate for meat grinding machines consisting of a pre-drilled soft metal backing plate, temporarily securing a cutter disc thereto and drilling the metal disc and separating the said parts and hardening said cutter disc, tinning one surface of the backing plate and the disc and sweating the parts together under pressure, slowly cooling the said parts while still under pressure, placing the backing plate on a rubber ring while finally grinding the said cutter disc.

5. A method of forming a cutter plate for meat grinding machines consisting of a soft metal backing plate and a hard tool steel metal disc temporarily secured to each other, drilling the metal disc and separating the parts, hardening said metal disc, tinning one surface of the backing plate and the metal disc and sweating the parts together, placing the parts in a press and slowly cooling the said parts, placing the backing plate on a slightly yieldable ring and regrinding the hardened disc to procure a perfectly flat surface.

6. The method of forming a cutter plate for grinding machines which consist in employing a backing plate and a disc of high speed tool steel, temporarily fastening the parts together and drilling the said disc, tinning the disc and backing plate and employing means to hold the parts in perfect alignment, sweating the parts together, placing the metal plate on a rubber pad and exerting pressure on the parts and slowly cooling the parts, removing the parts and again placing the backing plate on a rubber ring and grinding the outer surface of the tool steel disc.

In testimony whereof I affix my signature.

CHARLES A. LAEMMEL.